United States Patent [19]

Wang

[11] Patent Number: 5,255,389
[45] Date of Patent: Oct. 19, 1993

[54] DOCUMENT INTERCHANGE REPLACE OPTION VIA A COPY COMMAND

[75] Inventor: Diana S. Wang, Trophy Club, Tex.

[73] Assignee: International Business Machines Corporation, Armonk, N.Y.

[21] Appl. No.: 887,562

[22] Filed: May 18, 1992

Related U.S. Application Data

[63] Continuation of Ser. No. 543,902, Jun. 21, 1990, abandoned.

[51] Int. Cl.⁵ .............................................. G06F 15/40
[52] U.S. Cl. ................................. 395/600; 364/419.1; 364/283.1; 364/943.1; 364/DIG. 2
[58] Field of Search ................. 395/600; 364/DIG. 1, 364/DIG. 2, 419

[56] References Cited

U.S. PATENT DOCUMENTS

| | | | |
|---|---|---|---|
| 4,498,147 | 2/1985 | Agnew et al. | 364/900 |
| 4,503,499 | 3/1985 | Mason et al. | 364/200 |
| 4,648,061 | 3/1987 | Foster | 364/900 |
| 4,780,821 | 10/1988 | Crossley | 395/650 |
| 4,827,447 | 5/1989 | Croes et al. | 364/900 |
| 5,051,891 | 9/1991 | MacPhail | 395/600 |
| 5,063,495 | 11/1991 | MacPhail | 395/650 |
| 5,089,956 | 2/1992 | MacPhail | 395/600 |
| 5,101,345 | 3/1992 | MacPhail | 395/600 |
| 5,113,499 | 5/1992 | Ankney et al. | 395/325 |
| 5,138,711 | 8/1992 | Miyoshi et al. | 395/600 |
| 5,162,992 | 11/1992 | Williams | 364/419 |

OTHER PUBLICATIONS

Xerox, VP Series Reference Library Version 1.0 Xerox Corp (El Segundo Calif., 1985).
Waite et al. "The Waite Group's New & Primer Plus" pp. 450–453.
Desousa, M. R. "Electronic Information Interchange in an Office Environment," *IBM Syst Jour*, vol. 20, No. 1, pp. 4–23.
Schick et al. "The Document Interchange Architecture: A Member of a Family of Architectures in the SNA Environment", *IBM Systems Journal* vol. 21, No. 2, 1982, pp. 220–246.
Atkinson, Lee & Atkinson, Mark, *Using C,* QUE Corp., (Carmel, Ind.) pp. 10–15.
"Microsoft MS-DOS, User's Guide and User's Reference" by Microsoft Corporation, 1987-88.
"Using Wordperfect 5.1, Special Edition" by QUE Corporation, 1989.

*Primary Examiner*—Thomas C. Lee
*Assistant Examiner*—Paul R. Lintz
*Attorney, Agent, or Firm*—David A. Mims, Jr.; James H. Barksdale

[57] ABSTRACT

A method of replacing portions of one revisable form document in a shared library with that of another is disclosed. This invention provides a COPY command with options for specifying objects in a revisable form document to be used during a replace operation. The replace option allows the replacement of the document content and profile information of an existing document with the content and profile of another existing document. The document to be replaced maintains the same library assigned document name instead of having a new one created. The document to be replaced may exist in a folder and is required only to be in a revisable form state. The document used to replace the document content and profile remains unchanged after the replace operation is completed.

5 Claims, 3 Drawing Sheets

COPY COMMAND

| COMMAND | OPERANDS |
|---|---|
| COPY | IDENTIFIED-DATA, |
| | [,REFERENCED-DATA] (FROM FOLDER) |
| | [,REFERENCED-DATA] (TO DOCUMENT OR TO FOLDER) |
| | [,REFERENCED-DATA] (COPY AUTHORIZATION) |
| | [,AUTHORIZE] |
| | [,SOURCE-SERVICE] |
| | [,TARGET-SERVICE] |
| | [,REFERENCE-OBJECT-SCOPE] |
| | [,COPY-OPTION] |
| | [,ON-BEHALF-USER] |
| | [,MODIFY-DATA] |
| | [,UNIQUE-NAME] |
| | [,DOCUMENT-STATE] |
| | [,DEFER-OPTION] |

```
COPY COMMAND
   COMMAND          OPERANDS
   COPY             IDENTIFIED-DATA,
                    [,REFERENCED-DATA] (FROM FOLDER)
                    [,REFERENCED-DATA] (TO DOCUMENT OR TO FOLDER)
                    [,REFERENCED-DATA] (COPY AUTHORIZATION)
                    [,AUTHORIZE]
                    [,SOURCE-SERVICE]
                    [,TARGET-SERVICE]
                    [,REFERENCE-OBJECT-SCOPE]
                    [,COPY-OPTION]
                    [,ON-BEHALF-USER]
                    [,MODIFY-DATA]
                    [,UNIQUE-NAME]
                    [,DOCUMENT-STATE]
                    [,DEFER-OPTION]
```

SIMPLE COPY OPTION

REQUESTER　　　　　　　　　　　　　SERVER
(PROCESS B)　　　　　　　　　　　　(PROCESS A)

⎯⎯⎯⎯⎯⎯⎯⎯ SRR COPY ⎯⎯⎯⎯⎯⎯⎯⎯▶

◀⎯⎯⎯⎯⎯⎯⎯ NRR ACKNOWLEDGE
　　　　　　　[NEW LADN, NEW UNIQUE
　　　　　　　NAME] (LAST) ⎯⎯⎯⎯⎯⎯⎯

*Fig. 4A*

CHECK IN OPTION

REQUESTER　　　　　　　　　　　　　SERVER
(PROCESS B)　　　　　　　　　　　　(PROCESS A)

⎯⎯⎯⎯⎯⎯⎯⎯ SRR COPY ⎯⎯⎯⎯⎯⎯⎯⎯▶

◀⎯⎯⎯⎯⎯ NRR ACKNOWLEDGE (LAST) ⎯⎯⎯⎯⎯

*Fig. 4B*

| LL | I | D | F | |
|---|---|---|---|---|
| X'0006' | X'C3' | X'7D' | X'01' | CHK |
| 0 | 2 | 3 | 4 | 5   6 |

THE CHK OPERAND VALUE HAS THE FOLLOWING FORMAT.

| FIELD | LENGTH | VALUE |
|---|---|---|
| OPTIONS | 1 | BINARY |
|     RESERVED | | X'00' |
|     SIMPLE COPY (DEFAULT) | | X'01' |
|     CHECK OUT | | X'02' |
|     CHECK IN WITH DELETE | | X'03' |
|     CHECK IN WITHOUT DELETE OPTION 1 | | X'04' |
|     CHECK IN WITHOUT DELETE OPTION 2 | | X'05' |
|     RESERVED | | X'06'-X'FF' |

*Fig. 5*

DOCUMENT INTERCHANGE REPLACE OPTION VIA A COPY COMMAND

This application is a continuation of Ser. No. 07/543,902 filed on Jun. 21, 1990, now abandoned.

CROSS-REFERENCE TO RELATED APPLICATIONS

This application is related in subject matter to the following applications filed concurrently herewith and assigned to a common assignee.

Application Ser. No. 543,903 filed by D. S. Wang entitled "Check In/Out Functions via a Copy Command", now pending.

Application Ser. No. 543,908 filed by D. S. Wang entitled "Document Interchange Copy Command", now pending.

FIELD OF THE INVENTION

This invention relates to data processing systems, and more particularly, to replacing portions of one document with the associated portions of another document.

BACKGROUND OF THE INVENTION

Electronic office systems frequently provide for the sharing of information through the use of data repositories called electronic libraries. These electronic (shared) libraries are capable of being accessed by users of common networks as well as users of networks of interconnected pieces of equipment and programs. A user (end user) may be any person, device, program, or computer system that utilizes the systems for information processing and information exchange. Within such systems, users frequently need to create new documents in target libraries using existing documents in source libraries, or enter new documents to existing folders. What is meant by source library is the currently existing site where the contents of a document are stored. In contrast, a target library is the site where a new copy of a source document is desired. The source and target libraries are frequently different but may exist in the same library. One method of creating these new documents requires the issuance of two separate commands. The first, a RETRIEVE command, fetches the document from the source library. A FILE command then stores the newly fetched document in the target library. Therefore, two independent actions are required for each attempted recreation of a document.

Another problem with document recreation centers around an inability to specify unique names for the target library documents. Users are limited to system generated names and cannot employ their own unique names for newly created documents. This limitation precludes the recreation of document from a source library into an existing folder consisting of a combination of related documents grouped together.

Still another problem exists when a revisable document, represented as a collection of individual objects, exist in a shared library. Frequently, changes are made to less than all objects or to only a single object. Since any changes to a revisable document is made on a copy and require transmittal to the shared library, significant savings are realized if only the changed objects are transmitted. What is needed is a method of copying documents in a single unit of work while providing the capability of specifying which objects are to be copied.

SUMMARY OF THE INVENTION

This invention relates to a method of replacing portions of one revisable form document in a shared library with that of another document. This invention provides a COPY command with options for specifying objects in a revisable form document to be used during a replace/partial copy operation. The replace option allows the replacement of the document content and profile information of an existing document with the content and profile of another existing document. The document to be replaced maintains the same library assigned document name instead of having a new one created. The document to be replaced may exist in a folder and is required only to be in a revisable form state. The document used to replace the document content and profile remains unchanged after the replace operation is completed.

BRIEF DESCRIPTION OF THE DRAWINGS

FIGS. 4A and 4B represent the typical responses generated when the COPY command of FIG. 3 is executed.

FIG. 5 is the basic structure of the COPY-OPTION operand for the COPY command shown in FIG. 3.

DETAILED DESCRIPTION

Figure 1:
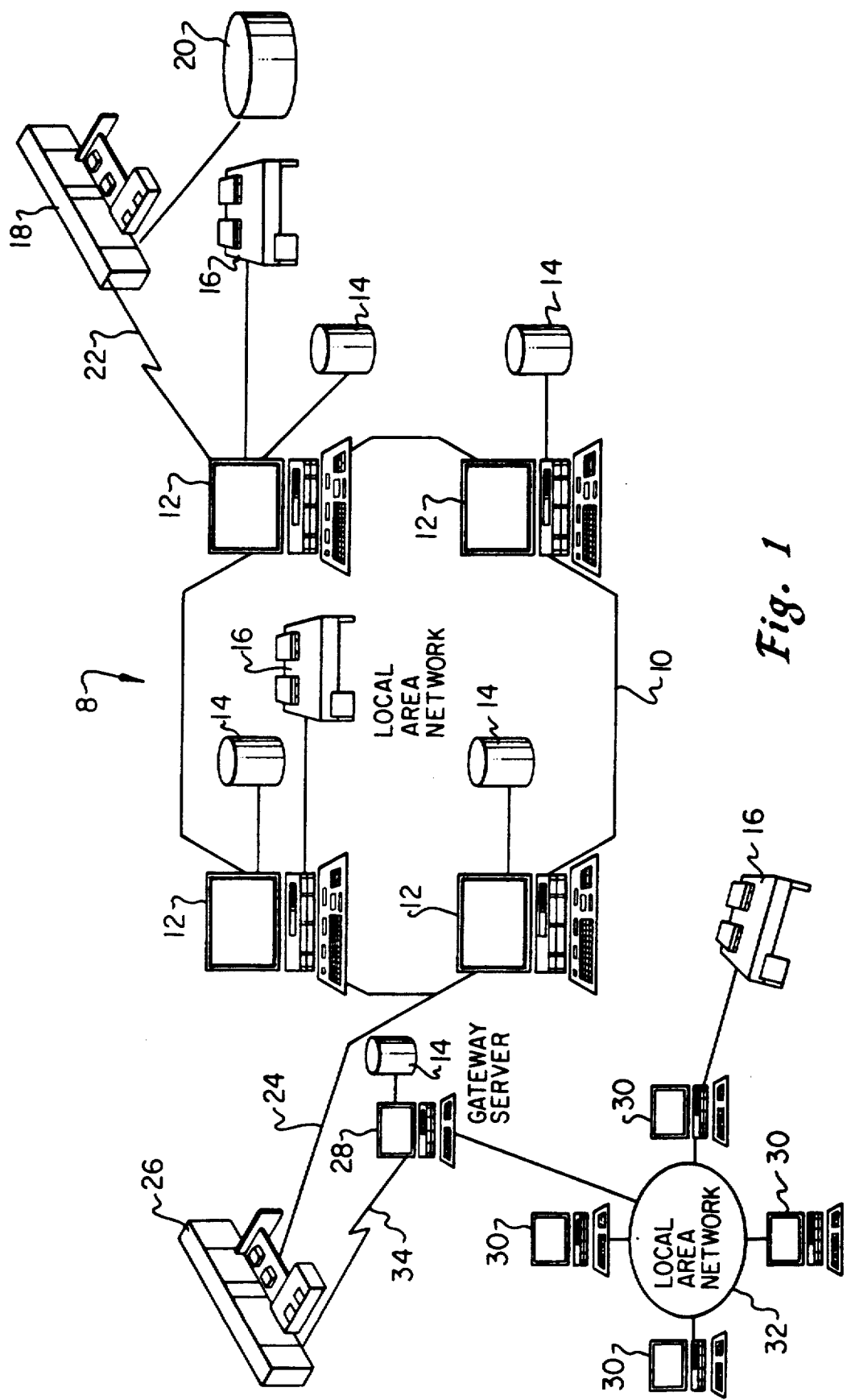
FIG. 1 is a block diagram of a document interchange management system where this invention may be practiced.

With reference now to the figures, and in particular with reference to FIG. 1, there is depicted a pictorial representation of data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store applications or resource objects which may be periodically accessed by any user within data processing system 8. In a manner well known in the prior art, each such application or resource object stored within a storage device 14 is associated with a Resource Manager, which is responsible for maintaining and updating all resource objects associated therewith.

Still referring to FIG. 1, it may be seen that data processing network 8 may also include multiple main frame computers, such as main frame computer 18, which may be preferably coupled to Local Area Network (LAN) 10 by means of communications link 22. Main frame computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, resource objects may be stored within storage device 20 and controlled by main frame computer 18, as resource manager for the resource objects thus stored. Of course, those skilled in the art will appreciate that main frame computer 18 may be located a great geographic distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and main frame computer 18 may be located in New York.

In known prior art systems of this type, should the user of an individual computer 30 or 12 desire to access a resource object stored within storage device 20, associated with main frame computer 18, the resource object may be stored using a communication architecture which allows it to be conveyed from one type of data management system to another irrespective of its content. One prior art communication architecture is the Document Interchange Architecture (DIA).

DIA is a program-to-program communication architecture which defines the protocols and data structures that enable programs to interchange information such as documents and messages in a consistent and predictable manner. DIA is independent of the type of information managed. DIA includes document objects which contain parameters or descriptors that describe the contents of the information being transmitted. The descriptors contained in the objects include, among other things, the name under which the information is filed, the authors, the subject of the information and the date the information was filed.

Still referring to FIG. 1, the library 20, when implemented using DIA structures, is capable of being accessed flexibly and simultaneously by a plurality of users and therefore represents a common repository or shared resource. Unlike the shared library 20, a user's personal or private documents are stored in a local resource 14. This local storage resource 14 is usually not shared with other users. When a user files a document in the library 20, a library server within a resource manager constructs parameters or descriptors that describe the contents of the information being stored in the library.

Figures 2, 3:
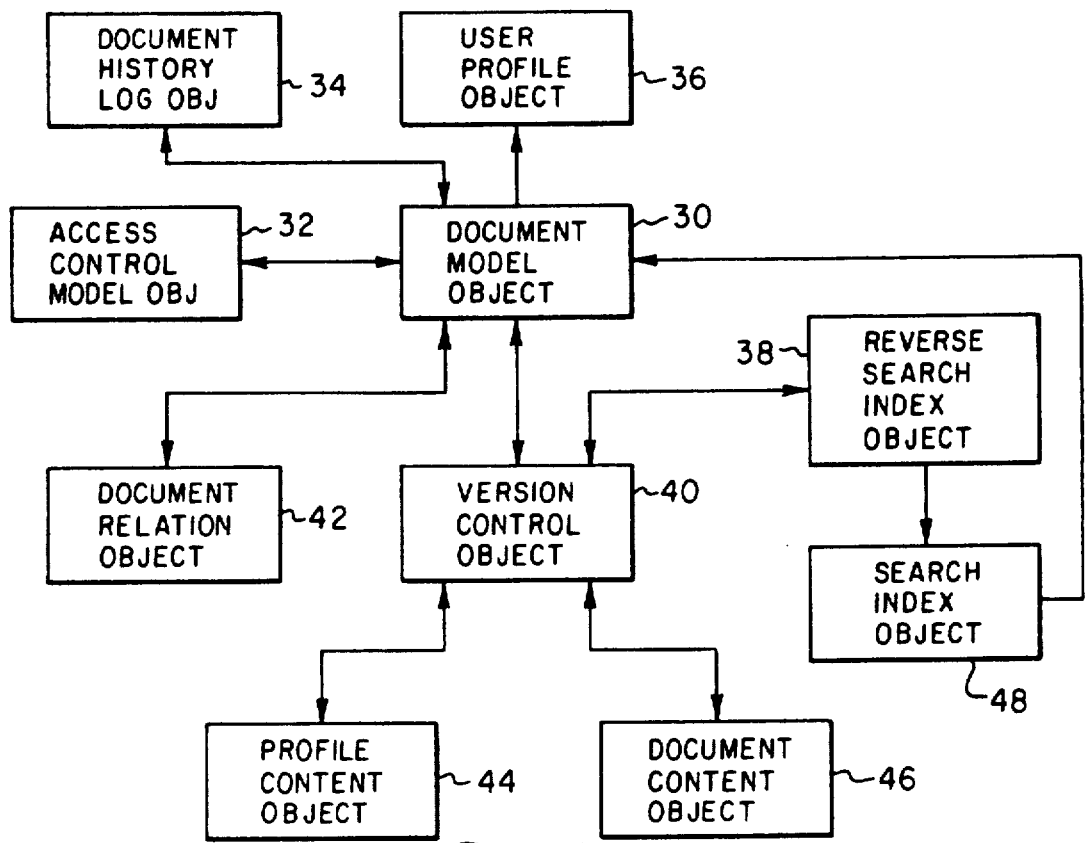
FIG. 2 is a basic document model created for each document filed in a shared library of the system shown in FIG. 1.
FIG. 3 is a document interchange COPY command with its available operands.

Referring to FIG. 2, a basic document model is shown for information stored in the library 20 as shown in FIG. 1. This document model is created and stored with each document. While it is not necessary to implement the basic document model explicitly to support DIA library service architecture, there is the requirement that a design be mapped to these models, or to a subset of them. A brief description of each component of the basic document model will now be given.

The User Profile Object 36 (UPO) is not part of the DIA document model, but is instead an object referred to by the DIA document model. The User Profile object 36 is created when the users represented are logged members of an Office System network. It identifies a user and contains information about the user such as aliases, services authorized to the user, default accounting information, and other user-specific information.

The Document Model Object 30 is the heart of the DIA document model and is logically the first object created when a document is filed for the first time in a document library. It contains information concerning ownership and attributes of a particular document. More specifically, it contains document instance attributes, such as whether the document is editable or non-editable; the maximum number of versions; and the action to be taken if the user has attempted to edit a document that cannot be edited.

The Access Control Model Object 32 (ACMO) is created when a document is filed for the first time into a DIA library. The principle purpose of the Access Control Model Object 32 is to consolidate information to be used in determining non-owner access to the document. It contains access control information such as whether the document is capable of being accessed by anyone (public), whether access is permitted to a limited number of explicitly specified users (private), or whether the information is shared with others.

The Document History Log Object 34 (DHLO) is optionally created when a document is filed in the library and the user wishes to record various activities on the document. For example, a user may wish to record the number of times the document was read and by whom.

The Document Relation Object 42 (DRO) is created when a document is first filed in the library. Its purpose is to describe the logical relationships between a document and other related or grouped documents. For example, the DIA architecture allows folder documents to be created that contain, other document. When such a relationship exists, then each document contained within the folder has a pointer entry called a Library Assigned Document Name (LADN) in the Document Relation Object 42.

The Version Control Object 42 (VCO) is created when a document is first filed into the library and contains information for several objects that may comprise a single named version of a document. It provides space for version naming, version level locks, and other version related level process controls.

The Profile Content Object 44 (PCO) is created when a document is first filed into the library and a user wishes to create sub-objects for performance or other reasons. The Profile Content Object 44 is the repository for Profile information related to the sub-objects.

The Document Content Object 46 (DCO) is created when a document is first filed into the library and provides storage for the document contents. In addition, the Document Content Object 46 provides storage for saving information concerning the actual size of the document in various units of measurement.

The Search Index Object 48 (SIO) contains entries used in searching within a document. The entries are placed in the SIO 48 as a result of the following sequence of actions on other objects. The basic Document Model Object 30 is first called as part of processing a FILE command. The Library Server then scans the Profile Content Object 44, the Document Relation Object 42, and the Access Control Model Object 32 to find terms to be used to support a parametric SEARCH. As each term is identified, an entry is made in the search Index Object 48 whose name includes the parametric search term value and semantics. If no SIO 48 exists when the Library Server scans the aforementioned objects, one is created and the entries placed therein as if the SEARCH Index Object 48 always existed.

The Reverse Search Index Object 38 (RSIO) exists to support the removal of Search Index Object 48 entries when a document is removed from the library by a DELETE command. Entries for parametric search terms are placed in the RSIO 38 at the same time they are being made in the Search Index Object 48.

Turning to FIG. 3, the COPY command is shown along with its available operands. This command is used to copy (replicate), replace, check-in or check-out documents in the library 20 of FIG. 1. The replicate feature of the COPY command creates a new document in a target library using an existing document in a source library. For the purpose of this invention, a target library is a storage device to which information is to be written while a source library is where that information is currently resident. A requester (user) may optionally enter a new document to an existing folder document in a target library. The source and target libraries need not be the same to use the COPY command. The requester must have at least "read" access to the source document and must maintain access to the folder to which the document is copied, as well as any newly created document in the target document. New Library Assigned Document Names (LADNs) are generated for any new documents in the target library.

The replace option of the COPY command allows a requester to replace the Interchange Document Profile (IDP) and the document contents of an existing document in the target library with the IDP and contents of an existing document in the source library. The document state of the document to be replaced must be revisable (X '02') for the COPY command to succeed. The requester must have at least "read" access to the document and "edit" access to the document to be replaced. The requester is not permitted to specify a folder option in the source library. The replace option does not change the LADN of the document to be replaced.

The check-out option of the COPY command allows a document from the source library to be checked out and copied to a target library. The document in the source library must be revisable and no other document modification can be in progress when the check-out function is performed. Once a requester is granted check-out authority, the profile and contents of the document in the source library is prevented from being changed.

Finally, the check-in option of the COPY command is used to check a previously checked out document into a target library. The check-in option not only checks the document back into the target library but may optionally be used to delete the document in the source library. The document profile is always checked in along with the document content (if any).

Still referring to FIG. 3, the IDENTIFIED-DATA operand is the only required operand of the COPY command. This operand specifies the name of the source document that will be used in the command. This is the existing document that will be copied to a target library.

The REFERENCED-DATA operand is an optional operand as indicated by its enclosure in brackets []. This operand is used to indicate if the source document will be placed in a folder. In such a case, the COPY command will use the existing unique name of the folder to accomplish the operation.

The REFERENCED-DATA operand may also be used to indicate that the source document is to be copied into a document in the target library. When used in this manner, the DID (Document ID) sub-operand value of this operand must match an RDID (Referenced-Data ID) value in the IDENTIFIED-DATA operand that identifies the source document, and the companion REL sub-operand for the RDID must specify "simple copy". The REFERENCED-DATA operand may also be used to supply a "copy authorization" sub-operand. This sub-operand may be used to identify a reference object in the document library for authorizations. When present, the newly created document will have the same authorizations as the reference object, except the ownership is set from the requester or ON-BEHALF-USER if present.

The AUTHORIZE operand is optionally supplied to allow the requester to specify access authority to the newly created document for users other than the owner and includes those users authorized to work on the owner's behalf. The AUTHORIZE operand is used to supply access control information. This information is assembled in the Access Control Model Object (ACMO). It may have parameters on explicit authorizations, public authorization, security level, shared authorization lists, and named user lists. The AUTHORIZE operand may be used in conjunction with a REFERENCED-DATA operand to identify an existing document object in the document library from which access authorizations are to be copied for the new document. This information is copied from the ACMO of the referenced document and is used to build the new document's ACMO.

The SOURCE-SERVICE operand specifies the GCID (Graphic Character ID) of the library name and the 1 to 44 character library name where the source document resides. The default of the SOURCE-SERVICE operand is the attached host. Likewise, the TARGET-SERVICE operand specifies the GCID of the library name and the 1 to 44 character library name where the new document will reside. The default is the attached host.

The COPY-OPTION operand is optional and if not present defaults to simple copy. Turning to FIG. 5, the structure for the COPY-OPTION operand is shown with the available values for the CHK operand. The setting of this operand determines if a simple copy, replace, check-in, or check-out function will be carried out. In a simple copy, a document is copied from the source library to a target library. However, when the COPY-OPTION operand is present, it may specify either the replace, check-in or check-out options through the CHK operand. A requester using the check-out option of the COPY-OPTION operand, may obtain a copy of a revisable document's profile and contents and have it placed in a target library. The requester must have read access to the document and no document modifications can be in progress when the check-out function is performed. The profile and contents of the checked out document in the source library are frozen and subsequent requests for the document are denied. Requesters may, however, modify the document authorizations of the checked out document in the source library.

When a document is successfully checked out of the source library, the library service of the source library creates a CHECKOUT-PARAMETER-SET in the Document Model Object (DMO) of the checked out document. The DOCUMENT-STATE of the checked out document is also changed from revisable-unlocked to revisable-locked to prevent other users from checking out the document or modifying it until it is checked back in. The CHECKOUT-PARAMETER-SET is deleted when the document is subsequently checked in. In addition, the library service of the target library must create a CHECKIN-PARAMETER-SET in the DMO of the new document now resident in the target library.

The CHECKIN-PARAMETER-SET field contains information needed to later check-in the document, such as the source library name from which the document was checked out. The check-out requester must have "edit" access to the checked out document and must maintain access to any folder into which the document is copied. The requester must become the owner of the newly created document.

The COPY command also provides for check-in of a document following alternations or modifications via the COPY-OPTION operand. The check-in option is available with or without deleting the source document following document check-in. The check-in "with delete" option checks the document back into a target library and deletes the document in the source library. The COPY command requires that the document profile be checked in along with any document contents. The original Library Assigned Document Name (LADN) of the checked out document is used when the document is checked back into the library. When the document was originally checked out, a CHECKIN-PARAMETER-SET was created in the Document Model object (DMO) of the target document and a CHECKOUT-PARAMETER-SET in the source document. Upon check-in these parameters are compared and document check-in is permitted only if they match. Check-in is also prohibited if the requester in the Document Model Object (DMO) of the source document does not match that in the target or if the requester no longer has at least "change" authority to the document to be checked in. Successful check-in of a document results in the replacement of the Interchange Document Profile (IDP) and the contents of the document in the target library with that in the source library. The library service will delete the CHECKOUT-PARAMETER-SET of the target document and the DOCUMENT-STATE will be changed from revisable-locked to revisable-unlocked.

Check-in is also available without deleting the document in the source library. The check-in "without delete" option is used to check a document back into a target library from a source library without deleting the document in the source library. Only the target library name and the LADN of the document in the target library will be erased in the source library. The DOCUMENT-STATE of the document in the target library will be changed from revisable-locked to revisable-unlocked and the CHECKOUT-PARAMETER-SET parameter for the document in the target library will be removed. The document profile must always be checked in along with the document contents (if any). As in the check-in with delete option, the document in the source library must have previously been checked out from the target library and its DMO must contain a CHECKIN-PARAMETER-SET. The user who originally checked out the document must perform the check-in. The document cannot be checked in if the CHECKOUT-PARAMETER-SET no longer exist in the document's Document Model Object (DMO) or if the requester does not match that listed in the DMO CHECKOUT-PARAMETER-SET of the checked out document, or if the requester no longer has at least "change" authority to the document to be checked in. Successful check-in is achieved by replacing any existing Interchange Document Profile (IDF) and content of the document in the target library with that in the source library. The check-in without delete option also permits check-in without erasing the target library name and the LADN of the document in the source library. In such a case, the DOCUMENT-STATE of the document in the target library will remain revisable locked, and the CHECKOUT-PARAMETER-SET of the document in the target library will not be removed.

Referring again to FIG. 3, the ON-BEHALF-USER operand is optional and identifies the user on whose behalf the COPY command is performed. The user identified in this operand must have the required authority to the document and folders. The MODIFY-DATA operand, if present, is used to add, delete or replace identified parameters within specified Document Interchange Architecture (DIA) objects for the new document. This operand only applies to the simple copy and check-out options and does not apply to the check-in option. In addition, the MODIFY-DATA operand will only apply to the top level of the document specified in the IDENTIFIED-DATA operand.

The UNIQUE-NAME operand is optionally supplied to allow the document to request a unique name in the context of the To-Folder. The unique name is a requester assigned, service guaranteed unique name for the object in a particular context. The UNIQUE-NAME operand allows the requester to specify the following:

1. A pointer to the object of the unique name. This is an object RDID of the IDENTIFIED-DATA operand.
2. A pointer to the context of the unique name. This is a context RDID which points to the REFERENCED-DATA operand.
3. The generate or reject option. This allows the requester to specify whether the requested name must be used, or if not unique to the context a generated acceptable name may be used. This option also allows the requester to specify whether the requested name can be obtained from the existing context rather than supplied in the operand. If a generated name is used, it is returned to the requester, along with the suppled name or existing name, in the REPLY-DATA operand. If the reject option is specified and the requested name is not unique, the command is rejected. Even if there is more than one context being requested, the reject option will apply to the entire command.
4. The context type, such as the library service.
5. The requested name to be given to the document in the specified context. This is ignored if the generate/reject option specifies to use an existing name.
6. A pointer to the source context of the existing unique name. This is a source RDID which points to the REFERENCED-DATA operand for the From-Folder. This is required if the generate/reject option specifies to use an existing name. It is ignored if the generate/reject option does not specify to use an existing name.

The DOCUMENT-STATE operand, if present, specifies the state in which the newly created document should be placed upon completion of the copy operation. This operand may be supplied if the COPY command causes creation of a new document. It is ignored if supplied with a COPY command that does not create a new document. If this operand is not specified, the document state of the newly created document will be revisable.

The DEFER-OPTION operand permits specification that a portion of the COPY request is to be performed immediately (synchronously) and the balance of the request is to be completed later (asynchronously). The DEFER-OPTION operand may be set (X '02') such that in the simple copy, case, a copy (RETRIEVE) of the document is obtained immediately from the source library (SOURCE-SERVICE) and held until it is to be filed (FILE) later in the target library (TARGET-SERVICE). For the check-in with delete case, a copy (RETRIEVE) of the document is obtained immediately from the source library (SOURCE-SERVICE) and held until it is to be filed (FILE) later in the target library (TARGET-SERVICE). The document in the source-service will then be deleted. It is an atomic action.

The DEFER-OPTION value may be set such that (X '01') retrieval of a copy of a document from the source library and filing it into the target library happens before an ACKNOWLEDGE signal is returned to the requester. When the DEFER-OPTION value is set to X '02' with simple copy, the COPY function will:
1. Retrieve a copy of the document from the source library.
2. Generate a SUBMIT command containing the FILE command.
3. Provide the SUBMIT command to general delivery services on behalf of the requester using the DIA service router.

The general delivery services will return via an ACKNOWLEDGE command the Unique Delivery Identifier (UDI) for the FILE command. The COPY command will then return the UDI for the FILE command to the requester of the COPY command. This UDI can then be used by the COPY requester to query the SRQB for the status of the FILE request. The default of the operand is DEFER-OPTION=(not deferred).

Turning to FIG. 4A, when the COPY command is executed, the library service returns a reply to the requester. In the case of a simple copy, where a document is successfully copied to a target library, if the document is added to a folder, the target library service updates the Document Relation Objects (DRO) of both the document and the folder. The reply to the execution of the COPY command is an ACKNOWLEDGE command as indicated in FIG. 4A. Successful completion status is returned in the EXCEPTION-CODE operand. The Library Assigned Document Name (LADN) of the document created or replaced and the unique name (if present) of the new document are returned to the requester as status information in the REPLY-DATA operand of the ACKNOWLEDGE command. If multiple documents are copied, then the REPLY-DATA operand contains a new LADN, a document identifier and a unique name for each new document created.

Referring to FIG. 4B, when the check-in option is executed and a document is successfully checked into the target library, the document profile and contents in the source library replace the profile and content of the checked out document. The document's original Library Assigned Document Name (LADN) remains unchanged. The reply to the COPY command with check-in is an ACKNOWLEDGE command. Successful completion status is returned in the EXCEPTION-CODE operand of the ACKNOWLEDGE command.

Turning again to FIG. 4A, when a document is successfully checked out to a target library, the reply is via an ACKNOWLEDGE command. As described for the case of a simple copy, successful completion status is returned in the EXCEPTION-CODE operand. The Library Assigned Document Name (LADN) and the unique name of the new document are returned to the requester as status information in the REPLY-DATA operand of the ACKNOWLEDGE command. If multiple documents are copied, then the REPLY-DATA operand contains a new LADN, a document identifier and a unique name for each new document created.

In summary, this invention provides a method of copying documents in shared libraries which may include folder documents. A single COPY command is provided that gives a user the option of copying, replacing, checking in or checking documents from shared libraries. The copy option of the COPY command creates a new document in a target library using an existing document in a source document. A user is optionally permitted to copy a source document to a folder in a target library by providing a unique name for the folder. A user may use the replace option of the COPY command to copy particular objects making up a document. The replace option provides for the replacement of the Interchange Document Profile (IDP) and the document contents of a target document with the IDP and document contents of a source document. The check out option of the COPY command provides for the creation of a document in a target library from a document in the source library. Changes to the profile and contents of the document in the source library are prohibited until the document in the target library is returned to the library. The check-in option of the COPY command provides for the return of a previously checked out document to a target library. The check-in option gives users the option of deleting or keeping the source after it is returned to the target library. The COPY command along with its available operands gives a user a simple and flexible command for copying documents in shared libraries.

While the invention has been particularly shown and described with reference to preferred embodiments thereof, it will be understood by those skilled in the art that various changes in form and details may be made therein without departing from the spirit and scope of the invention.

What I claim is:

1. A computer-implemented method, in a data processing system, of replacing profile information and contents of a first document in a target library stored in one of a plurality of shared libraries with profile information and contents of a second document from a source library by a user, said method comprising the steps of:

determining if said first document stored in said plurality of shared libraries specified by said user in a single copy command in said target library is revisable and if said first document is in a folder document;

determining if said user has edit access to said first document and read access to said second document; and copying only profile information and contents of said second document into the profile information and contents of said first document specified in said single copy command when said first document is revisable and said user has edit access to said first document and read access to said second document and using a unique name provided in said single copy command to complete the copying step only when said first document is in a folder document.

2. In a data processing system having a plurality of work stations coupled to a host processor, storage means having a plurality of source and target libraries therein coupled to said host processor to form a network and capable of being simultaneously accessed by a plurality of users through said plurality of work stations, said data processing system comprising:

means for inputting a first existing document and a second existing document into a single copy command;

means for determining if said first existing document is in a folder document;

means for determining if said first existing document specified in said single copy command as a target document within one of a plurality of target libraries specified in said single copy command as a target library is revisable;

means for determining if one of said plurality of users has edit access to said first existing document and read access to said second existing document; and means for copying a portion of said second existing document into an associated portion of said first existing document when said first existing document is in said revisable state and said one of said plurality of users has edit access to said first existing document and read access to said second existing document, said copying means using a unique name provided in said single copy command to complete the copying only when said first existing document is in a folder document.

3. A computerized data processing system, which comprises:

a storage device;

means for determining access rights for a user to a plurality of documents in a plurality of shared libraries on said storage device specified in a single document interchange architecture copy command as source and target libraries; said determining means determines if said user has read access rights to any of said plurality of documents in said source library and if said user has edit access rights to any of said plurality of documents in said target libraries;

means for determining which, if any, of said plurality of documents specified by said user in said single document interchange architecture copy command existing on said storage device in said target libraries are in folder documents;

means for determining if said plurality of documents specified by said user in a single document interchange architecture copy command existing on said storage device are in a revisable state; and means for replacing portions of one of said plurality of documents which said user has edit access rights in said plurality of target library with the associated portions of a document which user has read access rights in said source library, said replacing means using a unique name provided in said single document interchange architecture copy command to complete the replacing only when said one of said plurality of documents specified by said user in said target libraries is in a folder document.

4. A computer-implemented method of replacing profile information and contents of a first document in a target library stored in one of a plurality of shared libraries in a data processing system with profile information and contents of a second document stored in a source library in said data processing system, comprising the computer implemented steps of:

specifying by an user said first document as a folder document in said target library in one of said shared libraries and said second document as a non-folder document in said source library in a single copy command to enable copying said second document into a folder in a network;

determining if said first document specified by said user in said single copy command is revisable;

determining if said user has edit access rights to said first document and read access rights to said second document; and automatically copying profile information and contents of said second document into the profile information and contents of said first document when the first document is revisable and prohibiting copying when the first document is not revisable and using a unique name provided in said single copy command to complete the copying step.

5. The method according to claim 4 wherein a copy option operand is set by a user in said single copy command to invoke the copying of profile information and contents.

* * * * *